United States Patent
Chatterjee et al.

(10) Patent No.: US 7,386,774 B1
(45) Date of Patent: Jun. 10, 2008

(54) MEMORY UNIT WITH CONTROLLER MANAGING MEMORY ACCESS THROUGH JTAG AND CPU INTERFACES

(75) Inventors: Mitrajit Chatterjee, San Jose, CA (US); Ming Tang, Fremont, CA (US); Peter Z. Onufryk, Flanders, NJ (US); Steven Chau, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 508 days.

(21) Appl. No.: 10/788,943

(22) Filed: Feb. 26, 2004

(51) Int. Cl.
*G01R 31/28* (2006.01)
(52) U.S. Cl. ................................ 714/726
(58) Field of Classification Search ............. 714/726
See application file for complete search history.

(56) References Cited

U.S. PATENT DOCUMENTS

| | | | |
|---|---|---|---|
| 6,671,841 B1* | 12/2003 | Golshan ............... | 714/729 |
| 6,751,764 B1* | 6/2004 | Golshan et al. ......... | 714/729 |
| 7,054,121 B2* | 5/2006 | Koschella .............. | 361/1 |
| 7,133,990 B2* | 11/2006 | Link et al. ............ | 711/164 |
| 2006/0156033 A1* | 7/2006 | Desmicht et al. ....... | 713/193 |
| 2006/0294059 A1* | 12/2006 | Chamberlain et al. .... | 707/3 |

* cited by examiner

*Primary Examiner*—James C. Kerveros
(74) *Attorney, Agent, or Firm*—Glass & Associates; Victor H. Okumoto

(57) ABSTRACT

A memory unit includes a memory organized into protected and non-protected areas. A controller manages access to the memory so that the protected area can be written to through a JTAG or CPU interface. Once written to, the protected area is only accessible to particular logic and cannot be overwritten until the entire memory is erased. The controller is configured to allow a BCV to be stored in the memory through either the JTAG or CPU interface. The controller is also configured to allow writing to the protected area and boot configuration vector in memory before CPU boot-up by using a JTAG clock signal provided through an external pin when a system clock signal is not available. A reset circuit generates one or more initialization signals using either the BCV from memory or another BCV provided on external BCV pins, depending upon whether another external BCV pin is asserted.

19 Claims, 3 Drawing Sheets

MEMORY UNIT WITH CONTROLLER MANAGING MEMORY ACCESS THROUGH JTAG AND CPU INTERFACES

FIELD OF THE INVENTION

The present invention generally relates to memory controllers and in particular, to a memory unit with controller managing memory access through JTAG and CPU interfaces.

BACKGROUND OF THE INVENTION

In certain applications it is useful to restrict access to memory such as when the memory stores secret information like a private key for decryption purposes or a digital signature for authorization purposes. Although access to read such information may be restricted, it may be useful to allow multiple sources to write such information into the memory. Also, once the information is written, it is useful for security or other purposes to prevent the information from being maliciously or inadvertently overwritten.

Non-volatile memories are useful in these and other applications, because they maintain stored information even after power is turned off. Electrically programmable, non-volatile memories have the additional advantage of being programmable after their manufacture. This allows for easy customization at the system level.

A central processing unit ("CPU") is commonly used to program an electrically programmable, non-volatile memory. However, when information to be stored in the memory is necessary for the proper operation of the CPU, or is to be programmed before the CPU is booted-up or otherwise programmed without the CPU running at the time, another means for programming the memory in such cases is needed.

OBJECTS AND SUMMARY OF THE INVENTION

With the Joint Test Action Group ("JTAG") debugging techniques, electronic devices gather information about their own operation and route the information to external pins so that the information may be accessed by external JTAG hardware.

Various aspects of the present invention take advantage of the observation that the external JTAG hardware might also be used as an alternative to the CPU as a means to configure the memory and/or program it with information.

Accordingly, it is an object of the present invention to provide a memory unit with controller managing access to memory through JTAG and CPU interfaces.

Another object is to provide a memory unit wherein writing to a protected area of the memory is freely allowed and reading the written information from the protected area is restricted.

Another object is to provide a memory unit with controller that is capable of storing information in memory prior to the memory unit or its system leaving an assembly line.

Another object is to provide a memory unit with controller that is capable of storing information in memory prior to a CPU coupled to the memory unit booting up.

These and other objects are accomplished by the various aspects of the present invention, wherein briefly stated, one aspect is a memory unit comprising a memory and a controller, wherein the controller is configured to provide unrestricted access for writing information into an unwritten area of the memory and restricted access for reading the written information.

Another aspect is a memory unit comprising a memory including a protected area, a JTAG interface, logic, and a controller. The controller is configured to allow JTAG hardware to write information into the protected area through the JTAG interface, and allow the logic exclusive access to read the written information.

Another aspect is a memory unit comprising a memory, a JTAG interface, and a controller. The JTAG interface is clocked by a JTAG clock signal received from a external JTAG hardware. The controller is configured to allow the external JTAG hardware to write information into the memory through the JTAG interface. The controller is clocked by a system clock signal if the system clock signal is available or by the JTAG clock signal if the system clock signal is not available.

Yet another aspect is a memory unit comprising a non-volatile memory storing a first boot configuration vector, and a reset circuit coupled to a plurality of external boot configuration vector pins. When the boot configuration vector is to be provided internally (i.e., from within an integrated circuit device including the memory unit), a designated one of the external boot configuration vector pins is not asserted (e.g., not tied to a HIGH logic state). When the boot configuration vector is to be provided externally (i.e., from outside the integrated circuit device), the designated one of the external boot configuration vector pins is asserted (e.g., tied to a HIGH logic state) and a second boot configuration vector is provided on others of the external boot configuration vector pins. Consequently, the reset circuit first checks the status of the designated one of the external boot configuration vector pins upon its activation. If the status is in a first state (e.g., not asserted), the reset circuit generates one or more initialization signals using the first boot configuration vector. On the other hand, if the status is in a second state (e.g., asserted), the reset circuit generates its one or more initialization signals using the second boot configuration vector.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
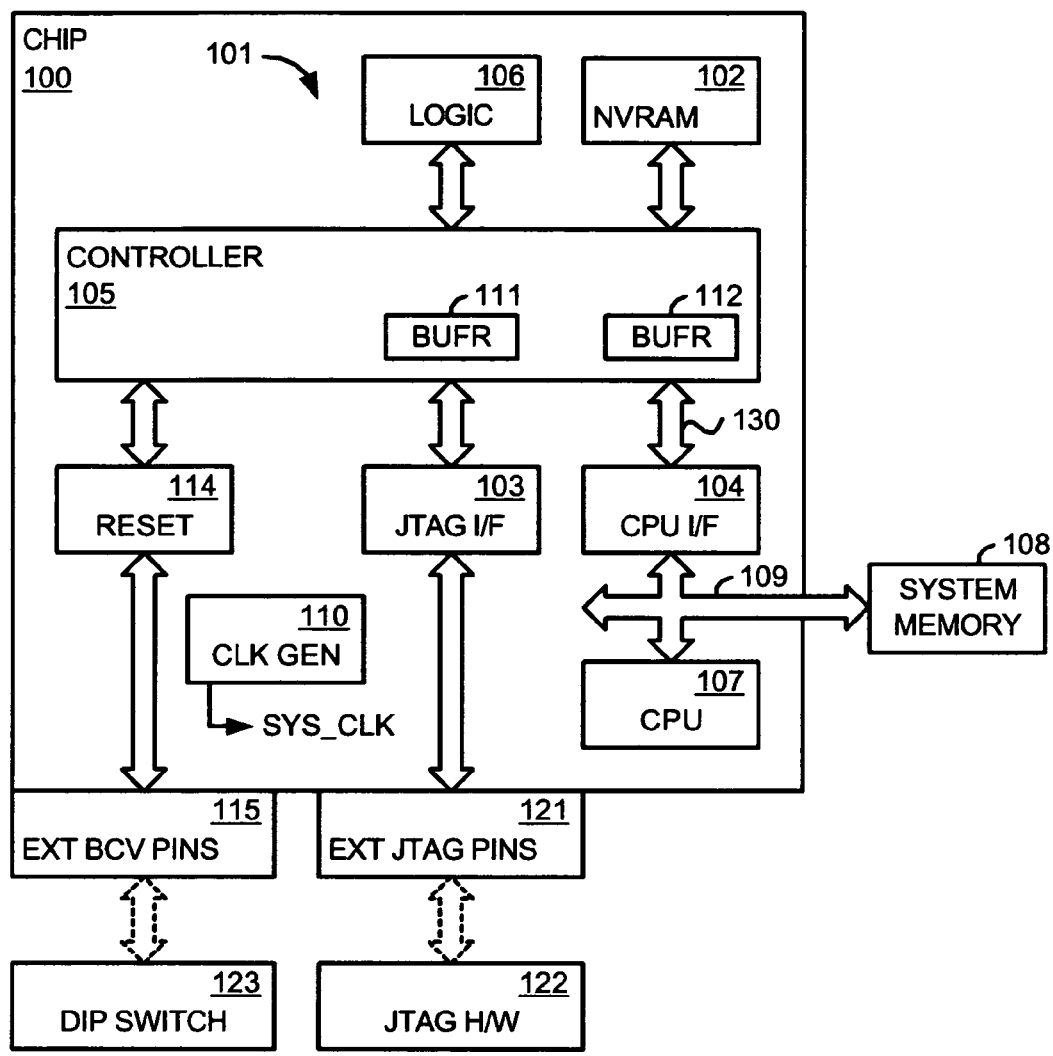
FIG. 1 illustrates a block diagram of a microprocessor system utilizing aspects of the present invention.

FIG. 1 illustrates, as an example, a block diagram of a portion of a Microprocessor System including various components on and off a Chip 100. An on-chip Memory Unit 101 includes a Non-Volatile Random-Access-Memory ("NVRAM") 102, a JTAG Interface ("JTAG I/F") 103, a CPU Interface ("CPU I/F") 104, a Controller 105, and Authorization Logic 106. Other on-chip components include a CPU 107 coupled to the Controller 105 through the CPU I/F 104, a Clock Generator ("CLK GEN") 110 which generates a System Clock Signal ("SYS_CLK") used for clocking the CPU 107 and other components on the Chip 100, and a Reset Circuit 114.

Off-chip components include System Memory 108 which is conventionally coupled to the CPU 107 through a System Bus 109, External JTAG Pins 121 which are coupled to the JTAG I/F 103, and External Boot Configuration Vector ("BCV") Pins 115 which are coupled to the Reset Circuit 114.

External JTAG Hardware ("JTAG H/W") 122 is coupled at times (as indicated by a dotted-arrow connection) to the JTAG I/F 103 through the External JTAG Pins 121 for debugging the Chip 100 and other purposes. The hardware is referred to as being JTAG H/W, because it follows the JTAG protocol in communicating with the JTAG I/F 103. On the other hand, a Dip Switch 123 (or other external hardware device) may be coupled (as indicated by a dotted-arrow connection) to the External BCV Pins 115 and manually or otherwise set for providing a BCV to the Reset Circuit 114 upon its request when a designated one of the External BCV Pins 115 is asserted by the Dip Switch 123. When the designated one of the External BCY Pins 115 is not asserted by the Dip Switch 123, however, a BCV stored in the NVRAM 102 is provided to the Reset Circuit 114 upon its request.

In normal operation, the Controller 105 is clocked by the System Clock Signal generated by the Clock Generator 110. Since the JTAG I/F 103 is clocked with a JTAG clock signal provided by the JTAG H/W 122, a First Input Buffer 111 is used in a conventional fashion to synchronize the signals from the JTAG I/F 103 with signals in the Controller 105 (i.e., clocking them into the First Input Buffer 111 using the JTAG Clock Signal and clocking them out of the First Input Buffer 111 using the System Clock Signal), because the two clock signals may be unrelated to each other. A First Output Buffer (not shown) is also included in the Controller 105 for synchronizing signals going in the opposite direction between the Controller 105 and the JTAG I/F 103.

In a preferred embodiment, an IP Bus 130 is clocked with an IP-Bus Clock Signal which is also internally generated on the Chip 100. In this case, a Second Input Buffer 112 is used in a conventional fashion to synchronize the signals from the CPU I/F 104 with signals in the Controller 105. A Second Output Buffer (not shown) is also included in the Controller 105 for synchronizing signals going in the opposite direction between the Controller 105 and the CPU I/F 104. A corresponding pair of buffers is also included in the CPU I/F 104 for synchronizing signals between the IP Bus 130, and the System Bus 109 which is clocked by the System Clock Signal.

Figure 2:
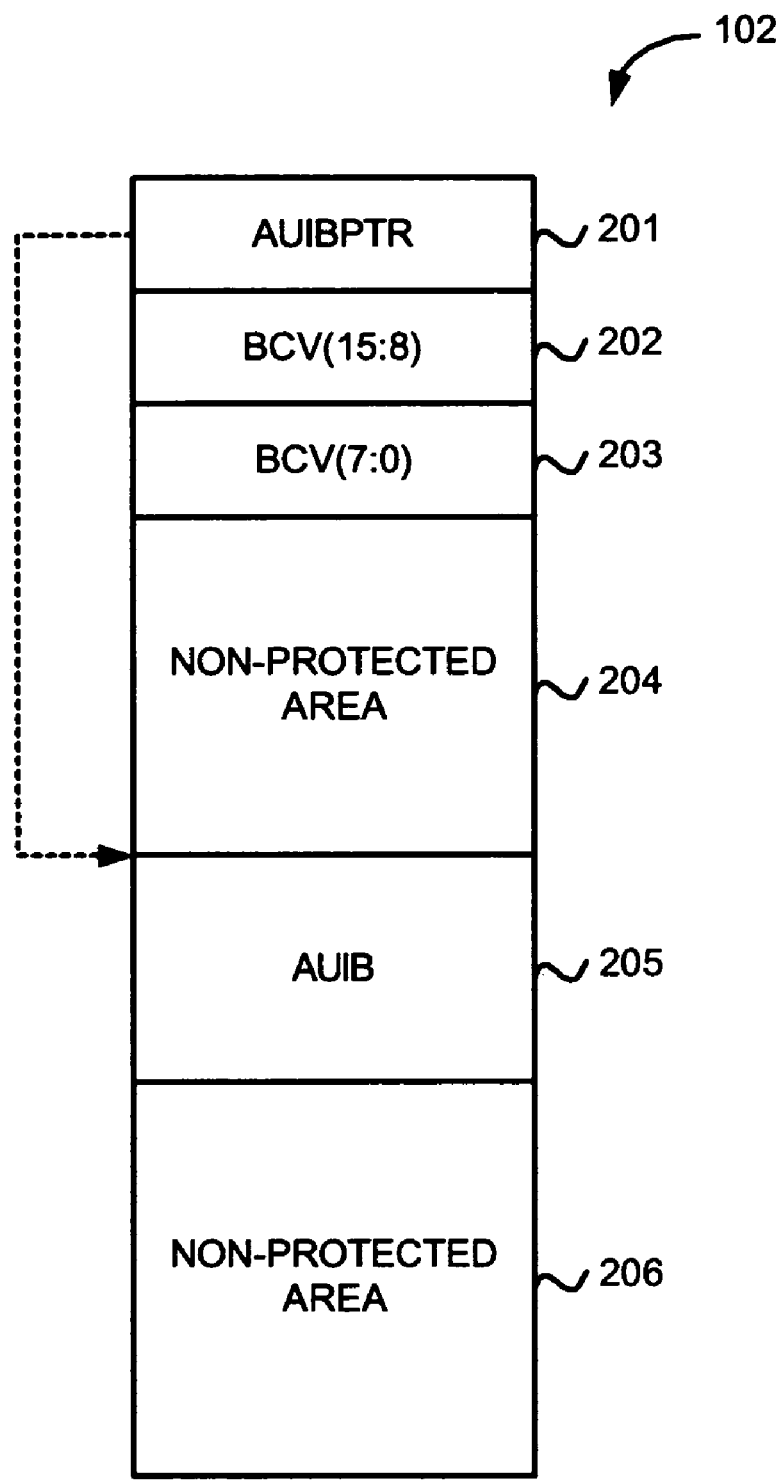
FIG. 2 illustrates a memory organization for a non-volatile memory utilizing aspects of the present invention.

An example of a memory organization for the NVRAM 102 is shown in FIG. 2. The NVRAM 102 in this case is preferably a flash EEPROM including both non-protected and protected areas. The non-protected areas include areas for storing upper and lower bytes of a Boot Configuration Vector ("BCV"), respectively 202 and 203, and areas 204 and 206 for general or otherwise non-reserved purposes.

The Controller 105 freely allows read and write access to the non-protected areas 202, 203, 204 and 206. Therefore, the CPU 107 is free to write information to and read information from these non-protected areas through the CPU Interface 104, and the JTAG H/W 122 and other JTAG related components such as a Scan Path are also free to write to and/or read from these non-protected areas through the JTAG Interface 103.

Although the CPU 107 may write to the upper and lower bytes of the BCV 202 and 203 at any time, the Memory Unit 101 can be advantageously configured so as to allow the external JTAG H/W 122 to write to these two bytes prior to boot-up of the CPU 107. Since the System Clock signal is not available prior to boot-up of the CPU 107, the Controller 105 uses the JTAG Clock Signal provided by the external JTAG H/W 122 for its operation in this case.

Figure 3:
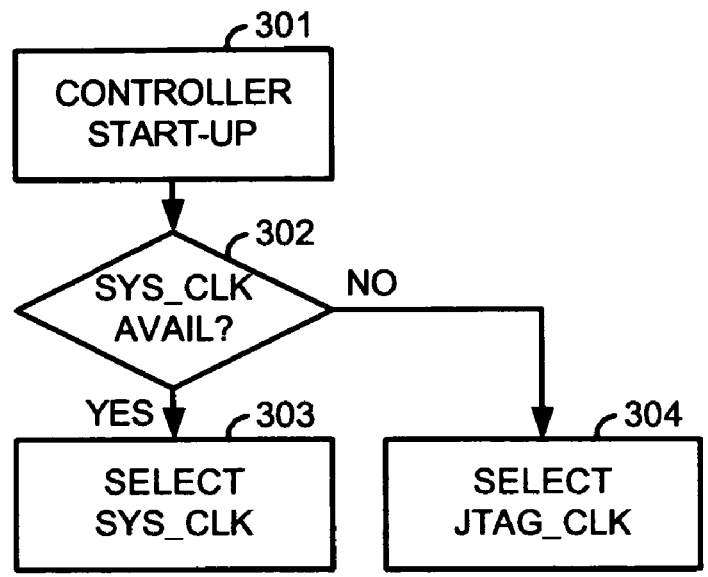
FIG. 3 illustrates a flow diagram of a method for selecting a clock signal in a memory unit utilizing aspects of the present invention.

A simple method for determining which clock signal to use is illustrated in FIG. 3. In 301 of that figure, the Controller 105 receives a start up indication through the JTAG I/F 103 or other source on the Chip 100. In 302, it (or another component on the Chip 100) determines whether the System Clock Signal is available.

If the answer is YES, then in 303, it uses the System Clock Signal for its operation. On the other hand, if the answer is NO, then in 304, it uses the JTAG Clock Signal.

Figure 4:
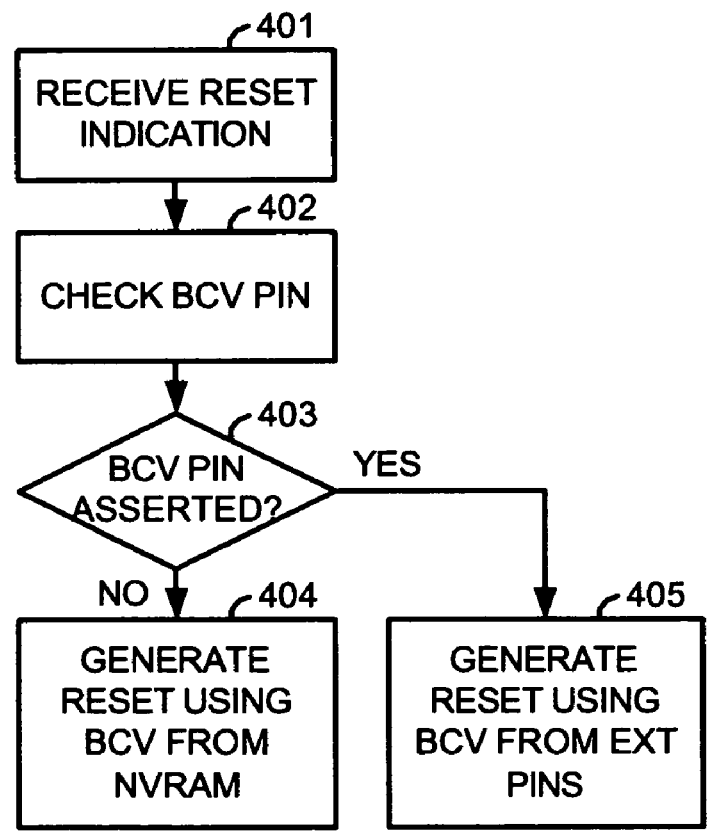
FIG. 4 illustrates a flow diagram of a method for providing a boot configuration vector utilizing aspects of the present invention.

On reset, it may be desirable for the Reset Circuit 114 to use a different BCV than the one stored in the NVRAM 102 to generate its one or more initialization (i.e., initial configuration) signals without over-writing the BCV stored in the NVRAM 102. The Reset Circuit 114 accommodates this by being configured to perform a method illustrated in FIG. 4. In 401 of that figure, the Reset Circuit 114 is activated by receiving a reset indication. In 402, it checks whether a designated one of the External BCV Pins 115 is asserted (e.g., by an external device pulling it to a logic HIGH state). In 403, a decision is made based upon whether the designated one of the External BCV Pins 115 is asserted. If the answer is NO, then in 404, the Reset Circuit 114 uses the BCV stored in the NVRAM 102 to generate its initialization signals. On the other hand, if the answer is YES, then in 405, the Reset Circuit 114 uses a BCV provided on other of the External BCV Pins 115 by the JTAG H/W 122 or other component coupled to the External BCV Pins 115 at the time to generate its initialization signals.

Reset is handled in the Memory Unit 101 in the following manner. The JTAG I/F 103 is reset on a System-Reset, Power-On-Reset, or when a JTAG-Reset Pin is asserted (which is one of the External Pins 121). The Controller 105, the Authorization Logic 106, and the NVRAM 101, on the other hand, reset on a System-Reset, Power-On-Reset, or an Internal Reset generated by the JTAG I/F 103. The JTAG I/F 103 generates the Internal Reset if the JTAG-Reset Pin is asserted and the System Clock Signal is not present. The JTAG I/F 103 does not generate the Internal Reset if the System Clock Signal is present. This allows the Controller 105, the Authorization Logic 106, and the NVRAM 101 to function normally when there is a System Clock Signal (such as the CPU 107 accessing the Controller 105) when the JTAG I/F 103 is being reset by the JTAG-Reset Pin being asserted.

Referring back to FIG. 2, protected areas in the NVRAM 102 include areas for storing an Authorization Unit Information Block ("AUIB") 205 and an Authorization Unit Information Block Pointer ("AUIBPTR") 201. These protected areas are used in conjunction with the Authorization Logic 106.

The function of the Authorization Logic 106 is to ensure that authorized software is locked to (i.e., only runs on) the CPU 107. Secret information used for such authorization is stored in the AUIB 205, whose location is specified by writing its initial address into the AUIBPTR 201.

The Controller 105 allows either the CPU 107 or the JTAG H/W to write to the AUIBPTR 201 and the AUIB 205. Once information is written into the AUIBPTR 201 and the AUIB 205, however, the Controller 105 only allows the Authorization Logic 106 to read their contents, and prevents any over-writing of the information until the NVRAM 102 is entirely erased (e.g., by setting all bits of the NVRAM 102 to zero).

Although the CPU 107 may write to the AUIBPTR 201 and the AUIB 205 at any time, the Memory Unit 101 can be advantageously configured so as to allow the external JTAG H/W 122 to write to these two areas of the NVRAM 102 while the Chip 100 or a system including the Chip 100 is still in its assembly line (such as during electrical and/or functional testing) and/or prior to boot-up of the CPU 107. Since the System Clock signal is not available prior to boot-up of the CPU 107, the Controller 105 uses the JTAG Clock Signal provided by the external JTAG H/W 122 (or other component coupled to the JTAG I/F 103 at the time) for its operation such as previously described in reference to FIG. 3.

Once information is written into the AUIBPTR 201 and the AUIB 205, any attempt by the CPU 107 or JTAG H/W 122 to read these protected areas of the NVRAM 102 results in receiving all "0's" back from the Controller 105, regardless of the values stored in the AUIBPTR 201 and the AUIB 205. Also, if either the CPU 107 or JTAG H/W 122 attempts to over-write these areas, such write operations will be ignored by the Controller 105.

For the JTAG I/F 103 to access the non-protected areas of the NVRAM 102 (or perform a first write to the protected areas) after the CPU 107 has been booted up, a JTAG START command is sent by the JTAG H/W 122 or other component coupled to the JTAG I/F 103 at the time. After the Controller 105 sees the JTAG START command, it performs the following actions: (i) it blocks any new access requests received from the CPU I/F 104, and (ii) waits for a period of a few clock cycles (corresponding to a clock synchronization delay for the Second Input Buffer 112) after any current access request from the CPU I/F 104 finishes before granting access to the JTAG I/F 103. The reason that the Controller 105 waits for the few clock cycles before granting access to the JTAG I/F 103 is to accommodate CPU access requests already residing in the Second Input Buffer 112 at the time the Controller 105 sees the JTAG START command.

If another access request from the CPU I/F 104 starts being processed before the period of the few clock cycles passes, then the Controller 105 loops back through (i) and (ii) above until no such access requests appear from the CPU I/F 104 before the period passes. After the JTAG H/W 122 or other component coupled to the JTAG I/F 103 is granted access to the NVRAM 102 and completes its operation, it sends a JTAG END command to the Controller 105 through the JTAG I/F 103. After seeing the JTAG END command, the Controller 105 is once again free to grant any permissible access requests from the CPU I/F 104 for the NVRAM 102.

Although the various aspects of the present invention have been described with respect to a preferred embodiment, it will be understood that the invention is entitled to full protection within the full scope of the appended claims.

We claim:

1. A memory unit comprising:
a non-volatile memory including a protected area, the protected area further including an authorization unit information block and an authorization unit information block pointer;
a JTAG interface;
authorization logic configured to authorize software to run on a CPU based on secret information in the authorization unit information block; and
a controller configured to allow JTAG hardware to write information into the authorization unit information block and into the authorization unit information block pointer of the protected area through the JTAG interface, to allow the authorization logic exclusive access to read the written information and to prevent any over-writing of the written information until the non-volatile memory is entirely erased.

2. The memory unit according to claim 1, further comprising a clock generator for generating a system clock signal, the clock generator coupled to the controller, wherein the clock generator, the non-volatile memory, the JTAG interface, the authorization logic and the controller are on a single chip.

3. The memory unit according to claim 2, wherein the non-volatile memory includes an unprotected area, and the controller allows the CPU to write, read and overwrite other information into the unprotected area through the CPU interface.

4. The memory unit according to claim 2, wherein the controller allows the CPU to write to the non-volatile memory through the CPU interface provided the JTAG hardware is not writing to the memory at the time.

5. The memory unit according to claim 4, wherein the controller allows the JTAG hardware to write to the non-volatile memory through the JTAG interface provided the CPU has not issued a request to write to the non-volatile memory at the time.

6. The memory unit according to claim 4, wherein the CPU interface and the JTAG interface are clocked by different clock signals and the controller includes at least one synchronization buffer to synchronize communications received from the CPU interface and the JTAG interface.

7. The memory unit according to claim 6, wherein the controller waits for a synchronization delay period related to the at least one synchronization buffer before granting the JTAG interface access to write to the non-volatile memory, if the CPU is not writing to the non-volatile memory at a start of the synchronization delay period and does not initiate a write to the non-volatile memory before an end of the synchronization delay period.

8. The memory unit according to claim 6, wherein the at least one synchronization buffer includes:
a first buffer for synchronizing signals between the JTAG interface and the controller; and
a second buffer for synchronizing signals between the CPU interface and the controller.

9. The memory unit according to claim 1, wherein the authorization unit information block pointer is configured to specify an initial address of the authorization unit information block, and the authorization logic is further configured to lock the software to the CPU.

10. A memory unit comprising:
a non-volatile memory including a protected area, the protected area further including an authorization unit information block and an authorization unit information block pointer;
authorization logic configured to authorize software to run on a CPU based on secret information in the authorization unit information block;
a JTAG interface clocked by a JTAG clock signal received from an external JTAG hardware; and a controller configured to allow the external JTAG hardware to write information into the authorization unit information block and into the authorization unit information block pointer of the non-volatile memory through the JTAG interface, and configured to allow the authorization logic exclusive access to read the written information, wherein the controller is clocked by a system clock signal if the system clock signal is available, and by the JTAG clock signal if the system clock signal is not available.

11. The memory unit according to claim 10, further comprising a CPU interface coupled to a CPU, wherein the CPU is clocked by the system clock signal, and the controller is configured to allow the CPU to write information into the non-volatile memory through the CPU interface provided the external JTAG hardware is not writing to the non-volatile memory at the time.

12. The memory unit according to claim 11, wherein the system clock signal is generated in an integrated circuit chip that includes the JTAG interface, the CPU interface, the CPU, and the controller.

13. The memory unit according to claim 12, wherein the controller includes a first synchronization buffer for synchronizing signals between the JTAG interface and the controller when the controller is clocked by the system clock signal.

14. The memory unit according to claim 13, wherein the CPU interface is clocked by an IP-bus clock signal, and the controller includes a second synchronization buffer for synchronizing signals between the CPU interface and the controller.

15. The memory unit according to claim 14, wherein the controller waits for a synchronization delay period related to the first and the second synchronization buffers before granting the JTAG interface access to write to the memory, if the CPU is performing a write to the memory at a start of the synchronization delay period and the CPU does not initiate another write to the memory before an end of the synchronization delay period.

16. The memory unit according to claim 10, wherein the controller is configured to prevent any over-writing of the written information until the non-volatile memory is entirely erased.

17. The memory unit according to claim 16, further comprising a clock generator for generating a system clock signal, the clock generator coupled to the controller, wherein the clock generator, the non-volatile memory, the JTAG interface, the authorization logic and the controller are on a single chip.

18. The memory unit according to claim 17, wherein, when data is written into the authorization unit information block and into the authorization unit information block pointer through the JTAG interface while the clock generator is operating, signals from the external JTAG hardware are synchronized with signals in the controller by clocking the signals from the external JTAG hardware into a first input buffer using the JTAG clock signal and clocking the signals out of the first input buffer using the system clock signal.

19. The memory unit according to claim 17, wherein the authorization unit information block pointer is configured to specify an initial address of the authorization unit information block, and the authorization logic is further configured to lock the software to the CPU.

* * * * *